United States Patent
Zou

(10) Patent No.: US 9,743,148 B2
(45) Date of Patent: Aug. 22, 2017

(54) VIDEO DEVICE WITH ELECTRONIC PROGRAM GUIDE APPLICATION AND METHODS FOR USE THEREWITH

(71) Applicant: Morega Systems Inc., Toronto (CA)

(72) Inventor: Zhifei Zou, Mississauga (CA)

(73) Assignee: Morega Systems Inc., Toronto (CA)

( * ) Notice: Subject to any disclaimer, the term of this patent is extended or adjusted under 35 U.S.C. 154(b) by 78 days.

(21) Appl. No.: 14/848,621

(22) Filed: Sep. 9, 2015

(65) Prior Publication Data
US 2017/0070785 A1    Mar. 9, 2017

(51) Int. Cl.
| | |
|---|---|
| H04N 5/445 | (2011.01) |
| H04N 21/482 | (2011.01) |
| H04N 21/431 | (2011.01) |
| H04N 21/472 | (2011.01) |
| H04N 21/475 | (2011.01) |
| H04N 21/485 | (2011.01) |
| G06F 3/0481 | (2013.01) |
| G06F 3/0482 | (2013.01) |

(52) U.S. Cl.
CPC ....... H04N 21/4821 (2013.01); G06F 3/0482 (2013.01); G06F 3/04817 (2013.01); H04N 21/4316 (2013.01); H04N 21/4755 (2013.01); H04N 21/47205 (2013.01); H04N 21/47214 (2013.01); H04N 21/4858 (2013.01); H04N 21/482 (2013.01)

(58) Field of Classification Search
CPC .................................................. H04N 21/482
USPC ........................................................... 725/39
See application file for complete search history.

(56) References Cited

U.S. PATENT DOCUMENTS

| | | | | |
|---|---|---|---|---|
| 8,826,347 | B1* | 9/2014 | Earle ................. | H04N 21/4825 725/109 |
| 2002/0199195 | A1* | 12/2002 | Townsend .......... | G06Q 30/0633 725/60 |
| 2007/0022436 | A1* | 1/2007 | Song ..................... | H04N 5/445 725/38 |
| 2008/0229359 | A1* | 9/2008 | Robinson ........... | H04N 5/44543 725/46 |
| 2015/0150053 | A1* | 5/2015 | Hardin ............. | H04N 21/44222 725/52 |

* cited by examiner

Primary Examiner — Michael Hong
(74) Attorney, Agent, or Firm — Garlick & Markison; Bruce E. Stuckman

(57) ABSTRACT

An electronic program guide application generates an interactive graphical user interface (GUI) for display. The GUI includes a channel navigation region that displays a plurality of channel icons corresponding to a plurality of video channels in accordance with a linear ordering of the video channels. A channel lens pane presents a selected channel icon, channel information corresponding to a selected video channel, and an interactive channel rank control icon that responds to user interaction to modify a position of the selected channel icon in the linear ordering. A channel schedule region presents a nonlinear temporal ordering of program panes, each program pane corresponding to a program presented on the selected video channel. Each program pane includes a program icon, program schedule information relating to a time the program is presented on the selected video channel.

17 Claims, 9 Drawing Sheets

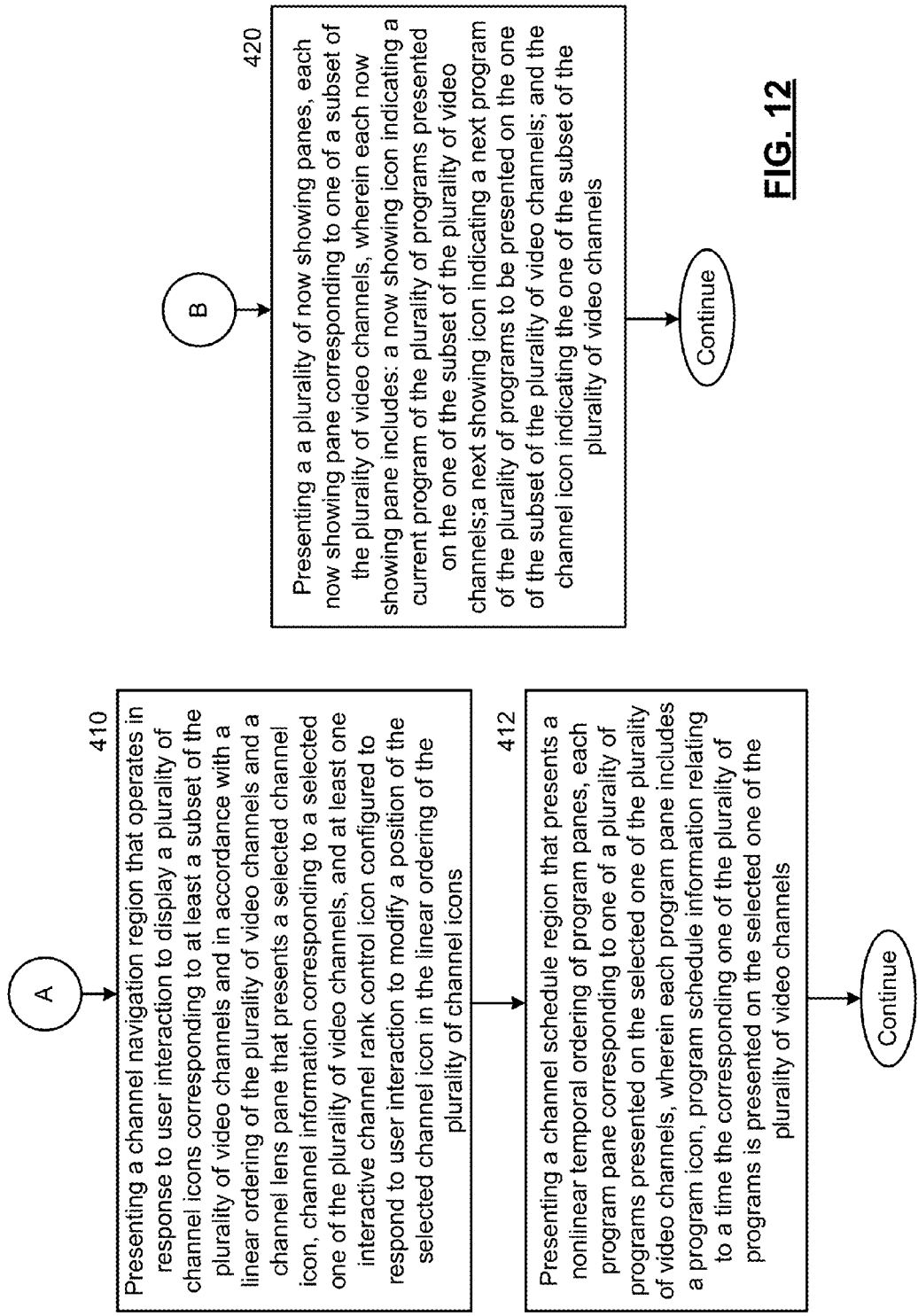

US 9,743,148 B2

VIDEO DEVICE WITH ELECTRONIC PROGRAM GUIDE APPLICATION AND METHODS FOR USE THEREWITH

TECHNICAL FIELD OF THE DISCLOSURE

The present disclosure relates to transfer, browsing and management of media content and related methods used in devices such as set-top boxes and other media presentation devices.

DESCRIPTION OF RELATED ART

The number of households having multiple television sets is increasing, and many users want the latest and greatest video viewing services. As such, many households have multiple satellite receivers, cable set-top boxes, modems, et cetera. For in-home Internet access, each computer or Internet device can have its own Internet connection. As such, each computer or Internet device includes a modem.

As an alternative, an in-home wireless local area network may be used to provide Internet access and to communicate multimedia information to multiple devices within the home. In such an in-home local area network, each computer or Internet device includes a network card to access an IP gateway. The gateway provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

In addition, many mobile devices, such as smart phones, netbooks, notebooks and tablet personal computing devices are capable of viewing video programming, either through the use of a television tuner card, or via streaming video thru either free or subscriptions services. Mobile devices are becoming a ubiquitous presence in the home, office and wherever else users happen to be.

The limitations and disadvantages of conventional and traditional approaches will become apparent to one of ordinary skill in the art through comparison of such systems with the present disclosure.

BRIEF DESCRIPTION OF THE SEVERAL VIEWS OF THE DRAWINGS

FIG. 11 presents a flowchart representation of a method in accordance with an embodiment of the present disclosure.

FIG. 12 presents a flowchart representation of a method in accordance with an embodiment of the present disclosure.

DETAILED DESCRIPTION OF THE DISCLOSURE INCLUDING THE PRESENTLY PREFERRED EMBODIMENTS

Figure 1:
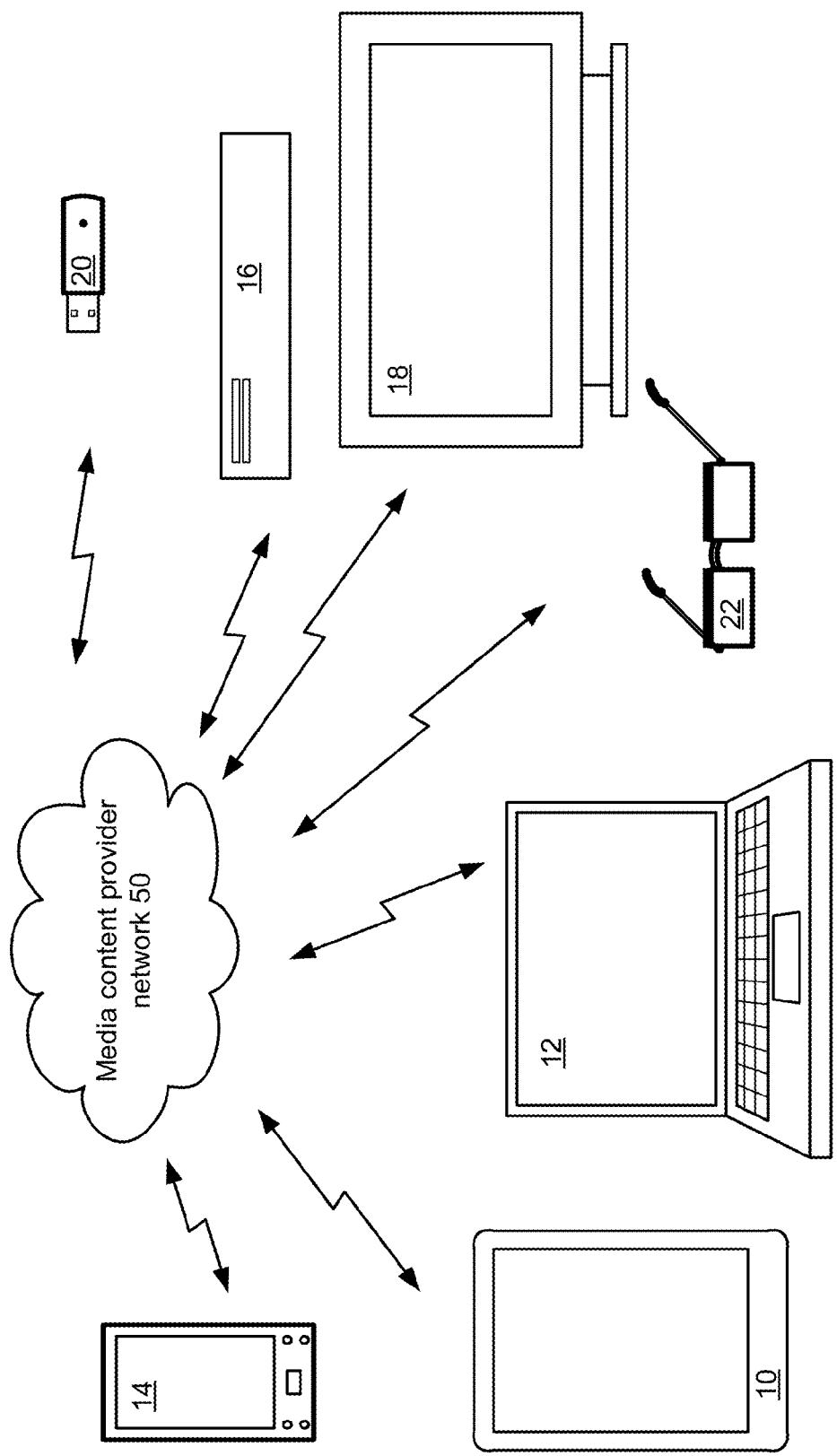
FIG. 1 presents a pictorial representation of video devices in accordance with an embodiment of the present disclosure.

FIG. 1 presents a pictorial representation of video devices in accordance with an embodiment of the present disclosure. In particular, a tablet 10, personal computer 12, smartphone 14, set-top box 16, television 18, streaming media player 20, and augmented reality (AR)/virtual reality (VR) devices such as glasses or goggles 22, present examples of video devices that can communicate with a media content provider network 50 in order to receive and display media content.

The media content provider network includes a cable network, optical network, IP television network, a satellite network, a cloud network, the Internet and/or one or more other transmission networks for providing media content. The media content can be in the form of one or more video programs and channels including audio signals, text, games, multimedia signals or other media signals that are either real-time signals in analog or digital format or data files that contain media content in a digital format. For instance, such media content can include video programs corresponding to one or more video channels formatted as a broadcast video signal, such as a television signal, high definition television signal, enhanced high definition television signal, ultra-high definition television signal or other broadcast video signal that has been transmitted and/or streamed over a wired or wireless medium, either directly or through one or more satellites or other relay stations or through the media content provider network 50. In addition, the media content can include over-the-top content, AR media such as video or graphical overlays on still or live images, VR media such as games VR tools and other VR content, media content from streaming media sources such as Netflix, Amazon, Hulu, YouTube, etc., web cams, local media sources such as GoPro devices, audio content such as webcast radio, music available from cloud providers, and other streaming and downloaded music content, and/or media content from other media sources and/or cloud content providers. Further, such media content can be included in a digital audio or video file, transferred from a storage medium such as a server memory, magnetic tape, magnetic disk or optical disk, or can be included in a streaming audio/video signal that is transmitted over a public or private network such as a wireless or wired data network, local area network, wide area network, metropolitan area network or the Internet.

The video devices execute an electronic program guide application to operate an electronic program guide based on program guide data received from the media content provider network 50 including, for example, channel information including channel icons, program schedule information for each channel including programs that are scheduled and their times, and program information including program icon, trailers or other previews, available formats, MPAA rating information, program durations, a program synopsis, parental rating information and other information.

In example where the video device is a tablet 10 or smartphone 14, such as an Apple iPhone, iPad or similar device, the electronic program guide application can be an "app" that is downloaded to the device from a remote server, selected from a main menu and executed in response to commands from the user. The electronic program guide application can similarly be an Android or Microsoft application used in conjunction with other compatible devices. In cases wherein the video device is a personal computer 12, set top box 16, television 18 or streaming media player 20, the electronic program guide application can be implemented via a resident utility, video player application, or can otherwise be implemented via other software and/or firmware etc.

The electronic program guide application includes an interactive graphical user interface that is presented via a display device that is either included in the video device or that is coupled to or otherwise associated with the video device. This interactive graphical user interface includes channel guide and/or now playing guide that will be described further in conjunction with FIGS. 2-12 in various embodiments and with several optional functions and features.

Figure 2:
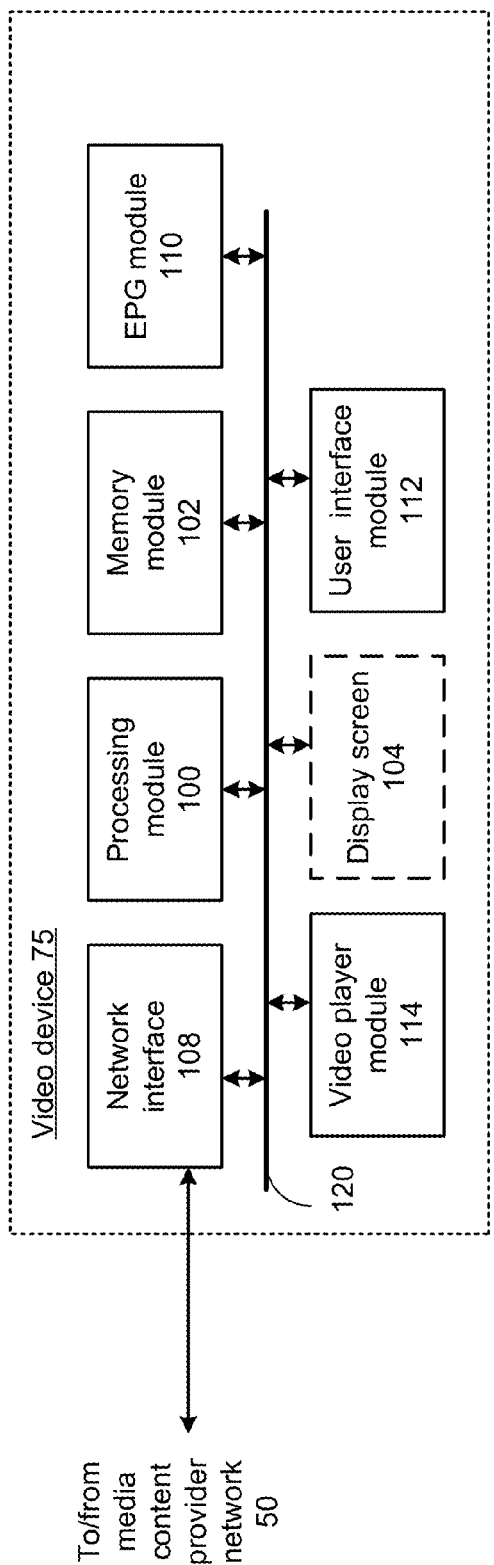
FIG. 2 presents a block diagram representation of a video device in accordance with an embodiment of the present disclosure.

FIG. 2 presents a block diagram representation of a video device in accordance with an embodiment of the present disclosure. The video device 75 includes a processing module 100, memory module 102, network interface 108, electronic program guide (EPG) module 110, user interface module 112, and video player module 114, that are interconnected via bus 120 with either a display screen 104 that is incorporated into the video device 75 or a video interface that allows operation in conjunction with a display device that is either associated with or coupled to the video device 75.

Processing module 100 controls the operation of the video device 75 and/or provides processing required by other modules of the video device 75. Processing modules 100 can each be implemented using a processor such as a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory modules 102. Memory module 102 can be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus structure is shown, other architectures, including the use of additional busses and/or direct connectivity between elements are likewise possible.

Network interface 108 can operate via a wired link for receiving program guide data and media content from a media content provider network 50. The network interface 108 can include an Ethernet connection, Universal Serial Bus (USB) connection, an Institute of Electrical and Electronics Engineers (IEEE) 1394 (Firewire) connection, small computer serial interface (SCSI) connection, a composite video, component video, S-video, analog audio, video graphics array (VGA), digital visual interface (DVI) and/or high definition multimedia interface (HDMI) connection or other wired connection that operates in accordance with either a standard or custom interface protocol. Network interface 108 can also operate via a wireless link that operates in accordance with a wireless network protocol such as 802.11a,b,g,n (referred to generically as 802.11x), Ultra Wideband (UWB), 3G, 4G or 5G cellular data, Bluetooth, Zigbee, Infrared Data Association (IrDA) or other or other wireless protocol other wireless connection that operates in accordance with either a standard or custom interface protocol in order to receive media content and program guide data.

The display screen 104 can include a liquid crystal display, cathode ray tube, plasma display, light emitting diode display or any other display device that creates an optical image stream either directly or indirectly, such as by optical transmission or projection, and/or that produces an audio output.

The user interface module 112 can include one or more buttons or switches, soft keys, a remote control device, such as an infrared or other wireless and remote control interface that communicates with the remote control device. The user interface module 112 can include a touch screen such as a resistive touch screen, capacitive touch screen or any other display screen separate from, or part of display screen 104 that creates an optical image stream either directly or indirectly, such as by optical transmission or projection, and further that generates touch data in response to the touch of the touch screen or near touch by a user, a stylus or other pointing object. The user interface module 112 can also include a microphone, and/or speaker, in addition to other devices and drivers that allow the user to interact with the video device 75.

The EPG module 110 includes an interactive graphical user interface that is presented via display screen 104 or other display device that is coupled to or otherwise associated with the video device. The user interacts with the interactive graphical user interface that is displayed on the display screen 104 or other display device to select a particular video program to record or to watch. In response, the video device 75 tunes to or otherwise requests or receives a video signal corresponding to the selected video program via the network interface 108. Such video signals can be received in a digital format such as a Motion Picture Experts Group (MPEG) format (such as MPEG1, MPEG2 or MPEG4), H.264, H.265, Quicktime format, Real Media format, Windows Media Video (WMV) or Audio Video Interleave (AVI), or another digital video format, either standard or proprietary.

The video signal can be decoded by video player module 114 which interacts with the user to control the playback of the selected video program on the display screen 104 or other display device. For example, the video player module 114 can provide capabilities to play, pause, fast forward, rewind, bookmark, and stop a video program as well as control the associated audio. In addition, the video player module allows the user record and store programs in the memory module 102 for later playback. Further, in addition to merely selecting programs to watch currently, the interactive graphical user interface generated by the EPG module allows the user to select current or scheduled video programs to record and store for later viewing. A recording schedule can be stored in the memory module 102 that reflects the programs that the user has selected to be recorded. In this fashion, a user of both video device 75 can select and watch a video program or other media content on either in real-time, pre-recorded or on a time-shifted basis.

The interactive graphical user interface includes channel guide and/or now playing guide that will be described further in conjunction with FIGS. 3-12 in various embodiments and with several optional functions and features. While shown as a separate module, the EPG module 110 can either implement one or more its functions in cooperation with one or more other modules of the video device 75 including processing module 100 or operate independently via a separate processing device in conjunction with software and/or firmware.

Figure 3:
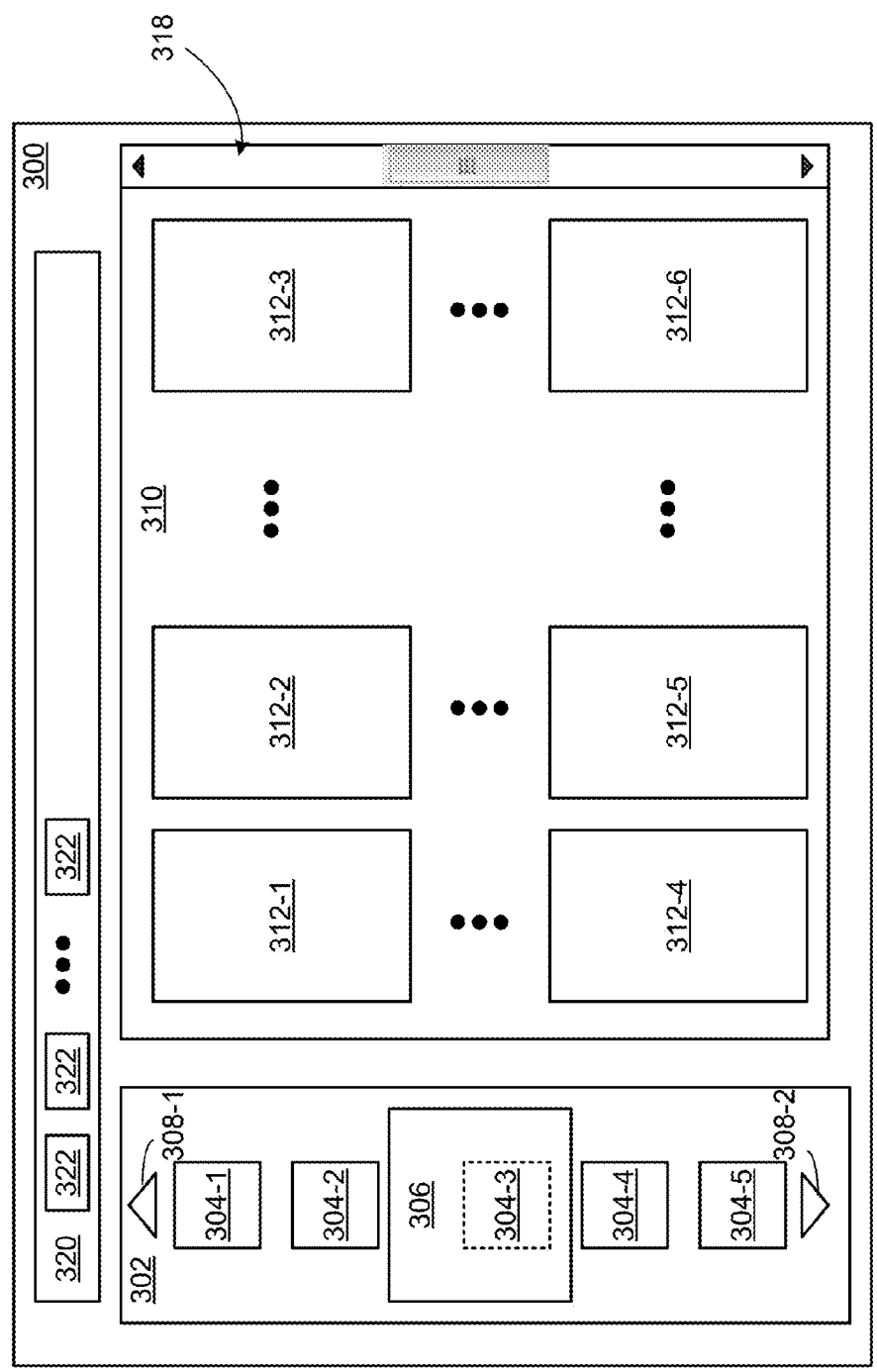
FIG. 3 presents a block diagram representation of a screen display in accordance with an embodiment of the present disclosure.

FIG. 3 presents a block diagram representation of a screen display in accordance with an embodiment of the present disclosure. In particular, the block diagram 300 presents the layout of an interactive graphical user interface generated by EPG module 110 that allows a user to search, navigate and select for display and recording various video programs presented on a plurality of video channels, together with other streaming, recorded an/or on-demand video, audio and media content available via media content provider network 50.

The toolbar region 320 includes a plurality of tools 322, such as icons, buttons or other interactive tools that allows the user to select a channel guide, now playing guide, or other guides that are directed specifically to movies, television shows, documentaries, sports, kids programming, etc. In the example shown, the interactive graphical user interface is presenting a channel guide that includes a channel navigation region 302 and a channel schedule region 310.

The channel navigation region 302 operates in response to user interaction to display a plurality of channel icons 304-1, 304-2, 304-3, 304-4, 304-5 . . . corresponding to at least a subset of the video channels available from media content provide network 50 along with a channel lens pane 306 that presents a selected channel icon, that selects the channel whose schedule is to be presented in the channel schedule region 310 that is adjacent to the channel navigation region 302.

In the example shown the channels icons 304-1, 304-2, 304-4, 304-5 . . . together with the channel icon 304-3 selected by the channel lens pane 306 are presented in a linear ordering of the video channels available from media content provide network 50. This linear ordering can be a pre-determined default ordering or a customized rank ordering controlled by the user to rank the available video channels in a rank order from most favorite or most used to least favorite to least used.

Consider a case where there are 35 video channels available (304-1 through 304-35), at any given time one video channel can be selected by selection of the corresponding channel icon 304-3 in the channel lens pane 306. Four additional channel icons (304-1, 304-2, 304-4, 304-5) are displayed corresponding to the two channels above the selected channel in the linear order and the two channels below the selected channel in the linear order. Activation by the user of one scrolling tools 308-1 or 308-2 advances the channel icons up or down, respectively. For example, activating the upward scrolling tool 308-1 moves the channel icon 304-4 into the channel lens pane 306 and makes the corresponding video channel the new selected channel. Channel icon 304-5 moves into the position previously occupied by 304-4. Further channel 304-6 (not shown) moves into the position previously occupied by 304-5. Similarly channel icon 304-3 moves from the channel lens pane 306 into the position previously occupied by 304-2 and channel icon 304-2 moves into the position previously occupied by 304-1. Channel icon 304-1 is removed from the display at this point. Activating the downward scrolling tool 308-2 operates in a reverse fashion to move the channel icons downward through the linear order. In this fashion, the user can scroll through the list of channel icons in either a default or customized order in order to select a particular video channel.

In addition to presenting a selected channel icon, the channel lens pane 306 can also present further channel information corresponding to the selected video channels and one or more interactive channel rank control icons configured to respond to user interaction to modify a position of the selected channel and corresponding channel icon in the linear ordering of the channels. The interactive channel rank control icons can include a bump control that advances the position of the selected channel in the linear ordering. Considering the case where the linear ordering is a rank ordering, the bump control can boost the position selected channel upward in the ranking, either one position at a time or otherwise to a desired position in the linear order. A similar buck control can lower the position of the selected channel in the linear ordering. In this fashion, channels in the linear ordering can be iteratively selected and positioned in order to create a custom rank ordering that reflects the desirability or importance of the channels to the user. A reset control can reset the position of the selected channel icon to a default position in the linear ordering of video channels.

The channel schedule region 310 presents program panes 312-1, 312-2, 312-3, 312-4, 312-5, 312-6 . . . that provide information on programs that are scheduled for showing on the channel selected by the channel lens pane 306. For example, the program panes 312-1, 312-2, 312-3, 312-4, 312-5, 312-6 . . . can each include a program icon and program schedule information relating to a time the corresponding programs is presented on the selected video channel. In circumstances where the video device provides program recording and storage, the EPG module can consult the recording schedule and provide further information to the user about programs that are currently recording or scheduled for recording. In particular, the program pane can provide a recording scheduled notification in panes 312-1, 312-2, 312-3, 312-4, 312-5, and/or 312-6 . . . if the corresponding program is scheduled for recording. In addition, a currently recording notification can be presented in the program pane if the corresponding program is contemporaneously recording. User selection of a current program pane can result in the video player module to tune to or otherwise retrieve the corresponding video program on the selected video channel for decoding and display. User selection of a upcoming program pane can result in the video player module to schedule a recording of the corresponding video program on the selected video channel or to providing a pop-up notification to the user at the corresponding scheduled time that provides a control icon that, when selected by the user, directs the video player module to tune to or otherwise retrieve the corresponding video program on the selected video channel for decoding and display at the appropriate time.

The program panes 312-1, 312-2, 312-3, 312-4, 312-5, 312-6 . . . can be arranged in a nonlinear temporal ordering. In the example shown, the nonlinear temporal ordering is a two-dimensional ordering including a plurality of rows and a plurality of columns. Scheduled times increase monotonically from left to right and from top to bottom—however each program pane can itself represent a different amount of time, based on the duration of the particular program represented by the program pane and/or its scheduled time. Thus, while occupying a fixed amount of position in the order displayed, a variable amount of time is represented by the different programs based on their respective durations. Said another way, a fixed horizontal distance in the ordering can correspond to a variable amount of time. Similarly, a fixed vertical distance in the ordering can also correspond to a variable amount of time.

In various embodiments, the ordering may selectively include and exclude programs in the schedule based, for example on user ratings. The program panes can include programs that the user is known to or predicted to like and/or exclude programs that the user is known to or predicted to dislike in order to present only those program panes deemed by the EPG to be mode relevant to the user. Excluded programs on the schedule for the selected channel can be omitted from the non-linear temporal ordering while maintaining the monotonically increasing temporal relationship from left to right and top to bottom.

The channel schedule region 310 includes a scrolling tool 318 that allows the user to scroll through the program schedule for the selected channel. In the example shown, the scrolling tool 318 is a scroll bar that allows the user through rows of program panes to move forward and backward in the non-linear temporal ordering. While a vertical scrolling tool is shown, a horizontal scrolling tool can be used in addition or in the alternative.

It should be noted that while the channel icons 304-1, 304-2, 304-4, 304-5 are shown as being displayed and navigated vertically, other orientations including horizontal orientations can likewise be employed. Further, while the channel navigation region 302 and channel schedule region 310 are shown as being horizontally adjacent, other arrangements where the regions are not adjacent or where they are vertically adjacent can likewise be employed.

Figure 4:
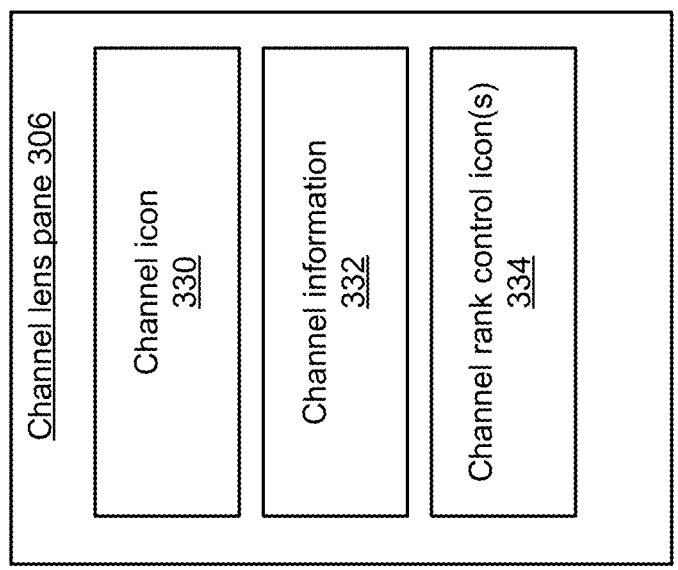
FIG. 4 presents a block diagram representation of a channel lens pane in accordance with an embodiment of the present disclosure.

FIG. 4 presents a block diagram representation of a channel lens pane in accordance with an embodiment of the present disclosure. In particular, a channel lens pane 306 is presented. The channel lens pane 306 includes a channel icon 330 corresponding to a selected video channel. The channel icon 330 can include text, an image, graphics and/or other media. The channel lens pane 306 also includes channel information 332 corresponding to the selected video channel such as a channel number, a channel format such as SD, HD, EHD, UHD, and or/other channel information. The channel lens pane 306 can also include one or more interactive channel rank control icons 334 configured to respond to user interaction to modify a position of the selected channel in the linear ordering of channels.

Figure 5:
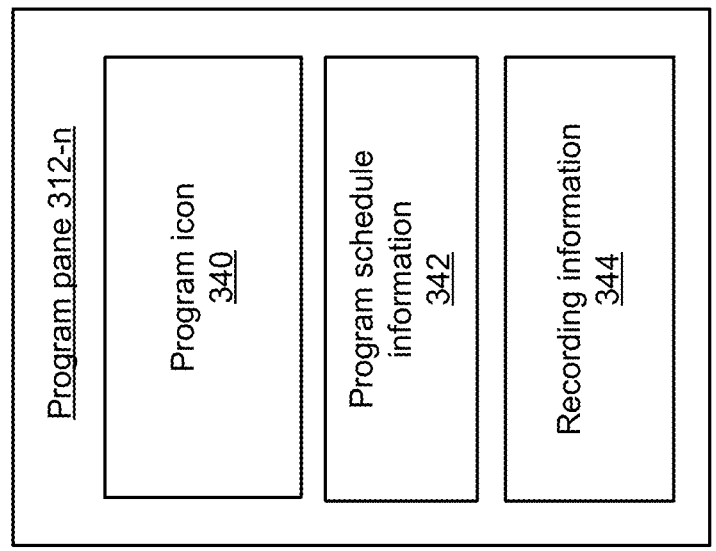
FIG. 5 presents a block diagram representation of a program pane in accordance with an embodiment of the present disclosure.

FIG. 5 presents a block diagram representation of a program pane in accordance with an embodiment of the present disclosure. In particular, a program pane 312-n is shown that includes a program icon 340. The program icon 340 can include text, an image, graphics, a video such as reduced format live video for a current program or a reduced format trailer or other preview for a scheduled program and/or other media. The program pane 312-n can include program schedule information 342 relating to a time the corresponding program is presented on the selected video channel, such as an elapsed time until the program begins, the scheduled time that the program begins, and/or alternative scheduled times for additional showings of the particular program.

As previously discussed, where the video device provides program recording and storage, the EPG module can consult the recording schedule and provide further information to the user about programs that are currently recording or scheduled for recording. In particular, the program pane 312-n can provide recording information 344 such as a recording scheduled notification if the corresponding program is scheduled for recording. In addition, the program pane 312-n can provide recording information 344 such as a currently recording if the corresponding program is contemporaneously recording.

Figure 6:
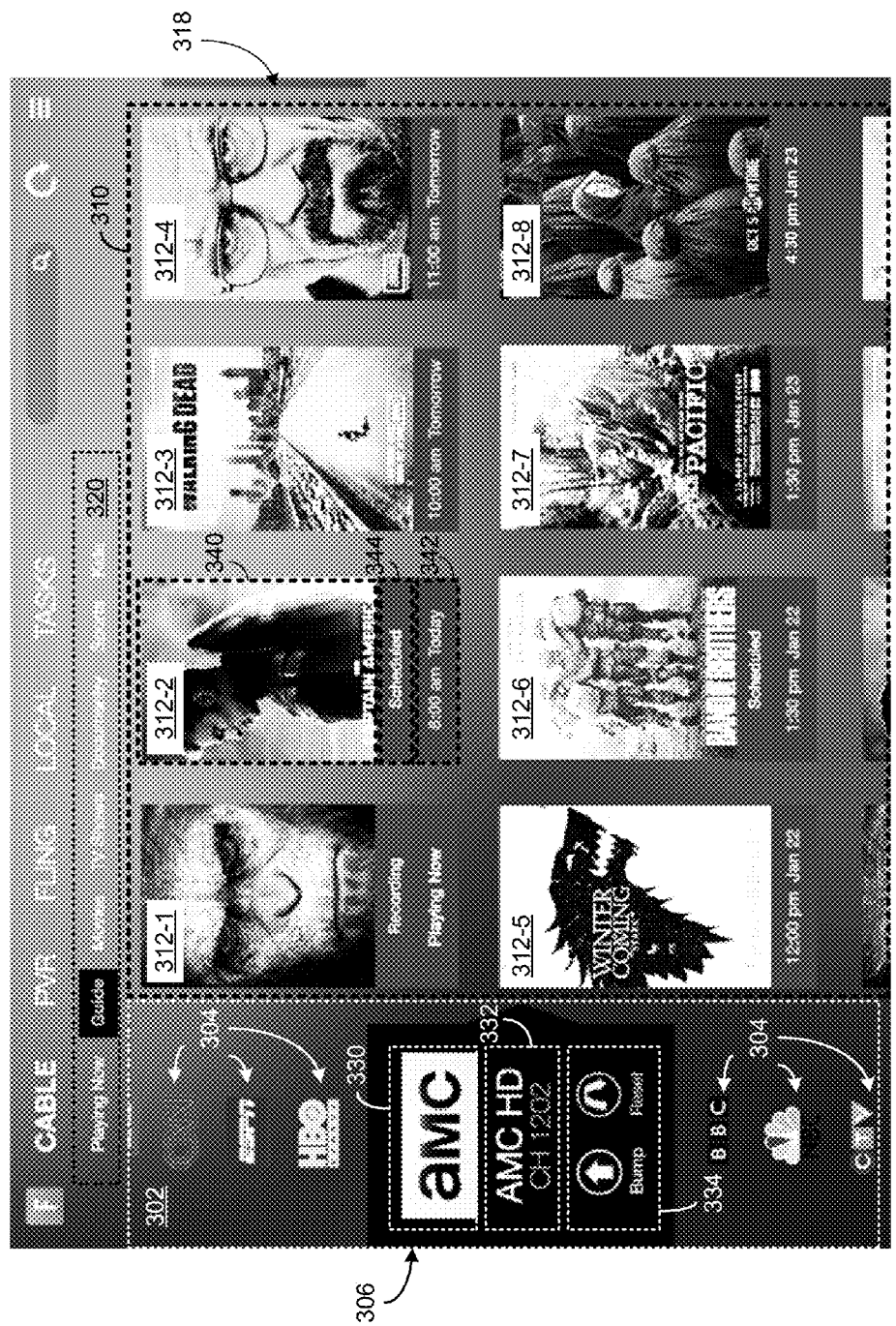
FIG. 6 presents a pictorial representation of a screen display in accordance with an embodiment of the present disclosure.

FIG. 6 presents a pictorial representation of a screen display in accordance with an embodiment of the present disclosure. In particular, the screen display shown presents the layout of an interactive graphical user interface generated by EPG module 110 that allows a user to search, navigate and select for display and recording various video programs presented on a plurality of video channels, together with other streaming, recorded an/or on-demand video, audio and media content available via media content provider network 50.

The toolbar region 320 includes a plurality of tools 322, such as icons that allow the user to select a channel guide, now playing guide, and other guides that are directed specifically to movies, television shows, documentaries, sports, kids programming, etc. In the example shown, the interactive graphical user interface is presenting a channel guide that includes the channel navigation region 302 and the channel schedule region 310.

The channel navigation region 302 operates in response to user interaction to display a plurality of channel icons 304 corresponding to CNN, ESPN, HBO, AMC, BBC, NBC and CTV that are presented in accordance with a linear ordering hat is either predetermined or customized based on user preferences. The channel lens pane 306 presents a channel icon 330 of AMC, the selected channel, along with channel information 332 relating to AMC and channel rank control icons 334 including a separate bump control and a reset control.

The channel schedule region 310 presents program panes 312-1, 312-2, 312-3, 312-4, 312-5, 312-6, 312-7 and 312-8 that provide information on programs that are scheduled for showing on AMC, the selected channel. For example, the program panes 312-1, 312-2, 312-3, 312-4, 312-5, 312-6, 312-7 and 312-8 each include a program icon and program schedule information relating to a time the corresponding programs is presented on the selected video channel—either "playing now" or a specific time and date. Program pane 312-1 indicates that the program "Planet of the Apes", is currently recording. Program panes 312-2 and 312-6 indicate that "Captain America" and "Band of Brothers" are scheduled for recording at the time indicated.

As shown, the program panes 312-1, 312-2, 312-3, 312-4, 312-5, 312-6, 312-7 and 312-8 include programs that the user is known or predicted to like and/or exclude programs that the user is known or predicted to dislike in order to present only those program panes deemed by the EPG to be mode relevant to the user. Considering the program panes 312-2, 312-3, 312-4, 312-5, 312-6, 312-7 and 312-8 in this order, they represent a non-linear temporal ordering, not only because they are presented in a two-dimensional array, but also because the progression of one pane to the next represents a variable passage of time as indicated by the relationships below:

312-2 to 312-3 (26 hours)
312-3 to 312-4 (1 hour)
312-4 to 312-5 (25 hours)

312-5 to 312-6 (1.5 hours)

312-6 to 312-7 (24 hours)

312-7 to 312-8 (3 hours)

These time periods represent not only the variable durations of each program but also the durations of excluded programs. A scrolling tool 318 is presented that allows the user to scroll through the program schedule for the selected channel. In the example shown, the scrolling tool 318 is a scroll bar that allows the user through rows of program panes to move forward and backward in the non-linear temporal ordering.

Figure 7:
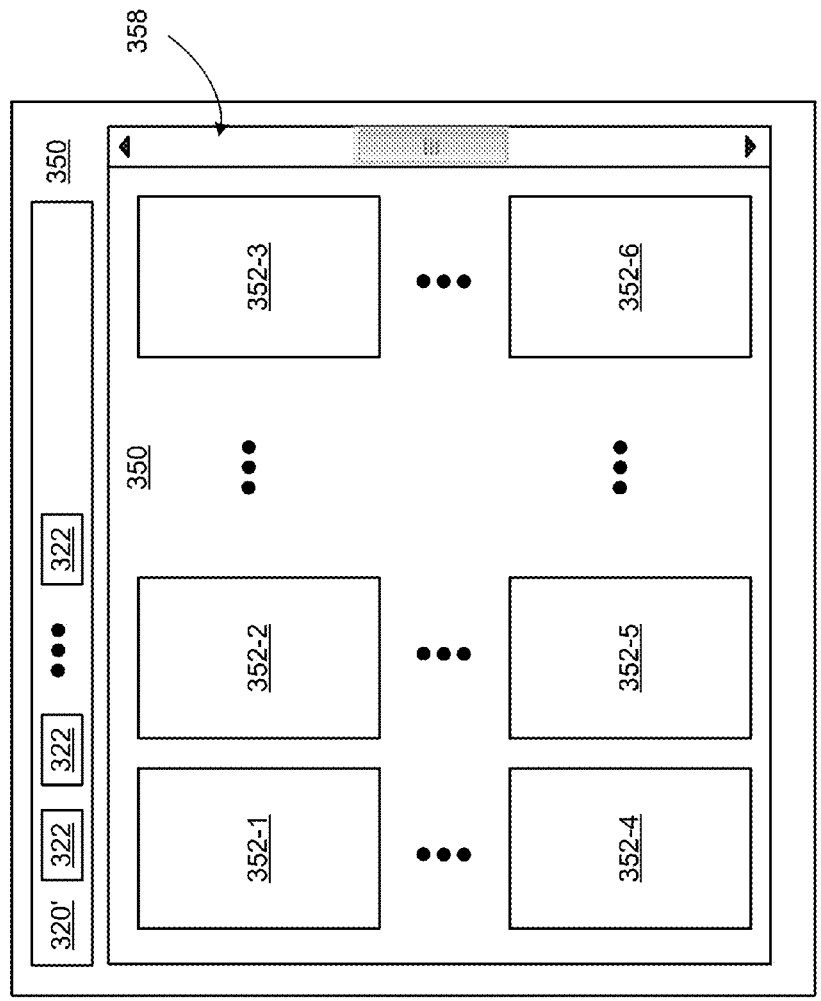
FIG. 7 presents a block diagram representation of a screen display in accordance with an embodiment of the present disclosure.

FIG. 7 presents a block diagram representation of a screen display in accordance with an embodiment of the present disclosure. In particular, the block diagram 350 presents the layout of an interactive graphical user interface generated by EPG module 110 that allows a user to search, navigate and select for display and recording various video programs presented on various video channels, together with other streaming, recorded an/or on-demand video, audio and media content available via media content provider network 50.

The toolbar region 320 includes a plurality of tools 322, such as icons, buttons or other interactive tools that allows the user to select a channel guide, now playing guide, or other guides that are directed specifically to movies, television shows, documentaries, sports, kids programming, etc. In the example shown, the interactive graphical user interface is presenting a now playing guide is selected and presented in now playing region 350 including a plurality of now playing panes 352-1, 352-2, 352-3, 353-4, 353-5, 352-6, . . . . Each of the now playing panes 352-n corresponds to one of the video channels available via media content provider network 50.

The now playing panes 352-1, 352-2, 352-3, 353-4, 353-5, 352-6, . . . can include a now playing icon indicating a current program presented on the corresponding video channel. User selection of a now playing icon can result in the video player module tuning to or otherwise retrieving the corresponding video program on the corresponding video channel for decoding and display. The now playing panes 352-1, 352-2, 352-3, 353-4, 353-5, 352-6, . . . can also include a next showing icon indicating a next program to be presented on the corresponding video channels, and/or a time indicating when the next program is to be presented on the corresponding video channel. User selection of a next showing icon can result in the video player module scheduling a recording of the next program at the scheduled time. The now playing panes 352-1, 352-2, 352-3, 353-4, 353-5, 352-6, . . . can also include a recording scheduled notification if the next program has been already scheduled for recording or a currently recording notification if the current program has been scheduled for recording.

In various embodiments, the now playing panes 352-1, 352-2, 352-3, 353-4, 353-5, 352-6, . . . are shown in a two-dimensional array that is based on the linear ordering of the plurality of video channels. For example the ordering of each video channel in the linear ordering discussed in conjunction with FIG. 3 can be represented in a positions segmented by rows. In an example where each row contains a number of now playing panes, each now playing pane 352-n+1 to the right of a now playing pane 352-n in a row corresponds to the next video channel in the linear ordering to its immediate left. Further the first (left-most) now playing pane in a new row represents to the next video channel in the linear ordering in relating to the last (right-most) now playing pane in the row above. Like the channel lens pane 306 described in conjunction with FIG. 3, the now playing panes 352-n can include one or more interactive channel rank control icon, such as a bump control, buck control, reset control or other control that permits the user to modify the position of the corresponding channel in the linear order.

A scrolling tool 358 is presented that allows the user to scroll through the now playing panes for each of the video channels. In the example shown, the scrolling tool 358 is a scroll bar that allows the user through rows of now playing panes to move forward and backward in the linear ordering of video channels. While a vertical scrolling tool is shown, a horizontal scrolling tool can be used in addition or in the alternative.

Figure 8:
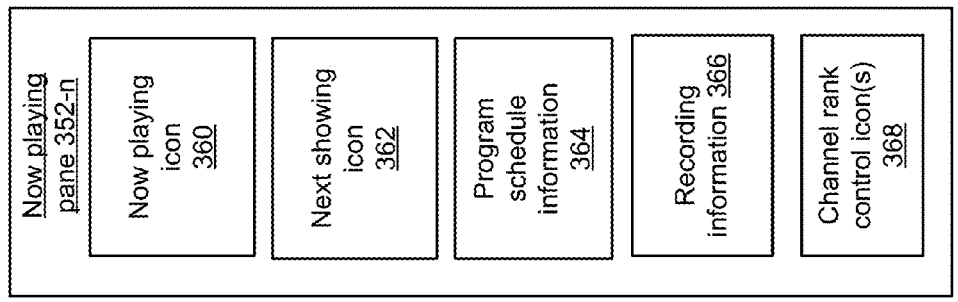
FIG. 8 presents a block diagram representation of a now playing pane in accordance with an embodiment of the present disclosure.

FIG. 8 presents a block diagram representation of a now playing pane in accordance with an embodiment of the present disclosure. A now playing pane 352-n that includes a now playing icon 360 indicating a current program presented on the corresponding video channel, a next showing icon 362 indicating a next program to be presented on the corresponding video channels, program schedule information 364 indicating a time when the next program is to be presented on the corresponding video channel. The now playing pane 352-n can also include recording information 366 such as a recording scheduled notification if the next program is scheduled for recording or a currently recording notification if the current program is scheduled for recording.

In addition, the now playing pane 352-n can include one or more channel rank control icons 368, such as a bump control, buck control, reset control or other control that permits the user to modify the position of the corresponding channel in the linear order.

Figure 9:
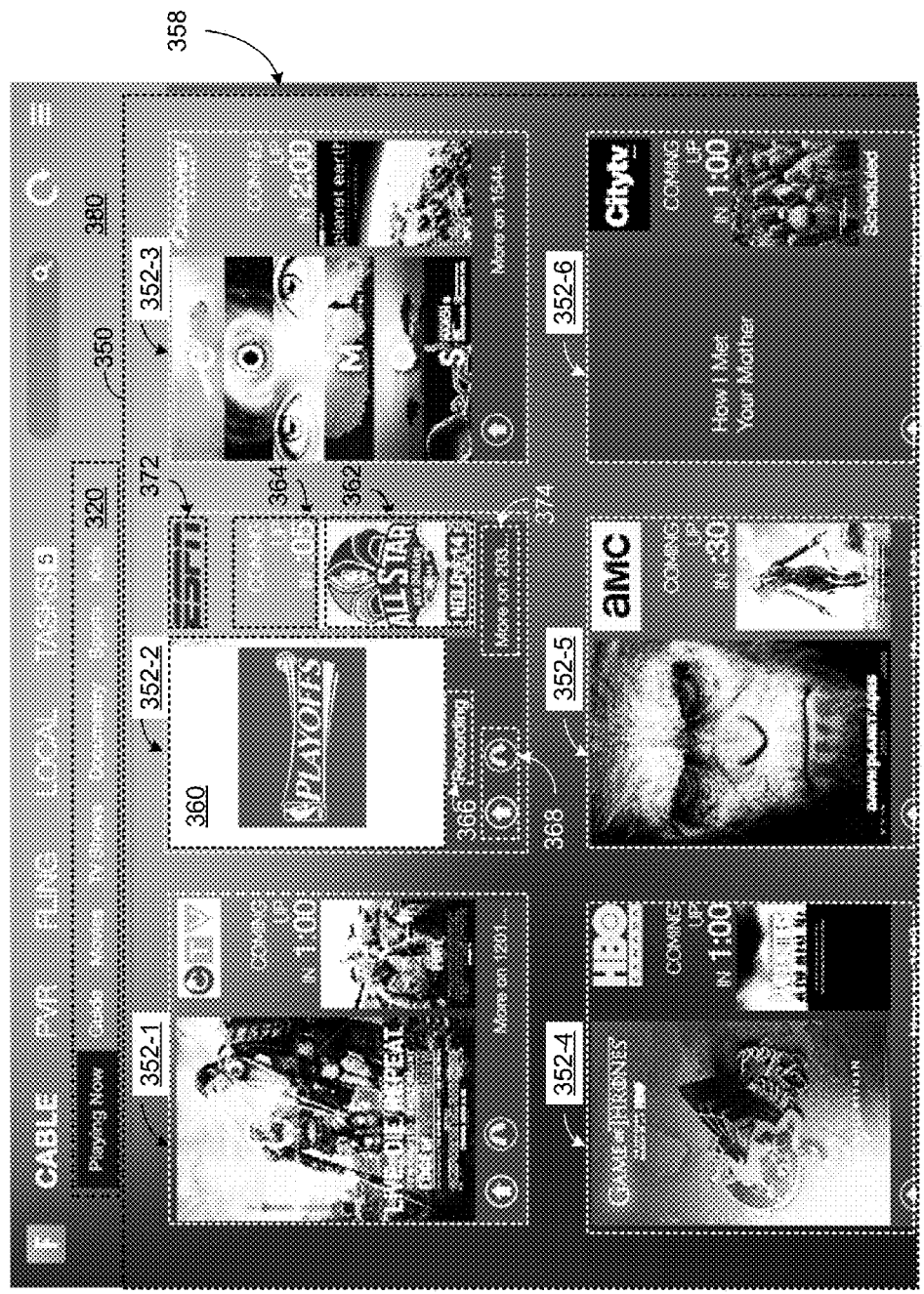
FIG. 9 presents a pictorial representation of a screen display in accordance with an embodiment of the present disclosure.

FIG. 9 presents a pictorial representation of a screen display in accordance with an embodiment of the present disclosure. In particular, the screen display 380 presents the layout of an interactive graphical user interface generated by EPG module 110 that allows a user to search, navigate and select for display and recording various video programs presented on a plurality of video channels, together with other streaming, recorded an/or on-demand video, audio and media content available via media content provider network 50.

The toolbar region 320 includes a plurality of tools 322, such as icons that allow the user to select a channel guide, now playing guide, and other guides that are directed specifically to movies, television shows, documentaries, sports, kids programming, etc. In the example shown, the interactive graphical user interface is presenting now playing guide in now playing region 350 including a plurality of now playing panes 352-1, 352-2, 352-3, 353-4, 353-5, 352-6. Each of the now playing panes 352-n corresponds to one of the video channels available via media content provider network 50. In this example, the information in each of the playing panes 352-n is presented in accordance with an information hierarchy to naturally attract a user's attention to important content. In particular, the size and arrangement of each of the icons and regions in each of the playing panes 352-n can be selected to emphasize information deemed to be most important to the user (e.g. current content), while de-emphasizing other information presented in the pane.

Take for example the now playing pane 352-2 corresponding to ESPN. The now playing pane 352-2 includes a channel icon 372, a now playing icon 360 indicating a current program presented on ESPN, a next showing icon 362, adjacent to, and smaller than the now playing icon 360, indicating a next program to be presented on ESPN. The now playing pane 352-2 further includes a time 364 indicating when the next program is to be presented on ESPN, interactive channel rank control icon 368, such as a bump control and reset control that permits the user to modify the position of ESPN in the linear order. The now playing pane 352-2 also includes a recording information 366 as a currently recording indicating the NBA playoffs are currently being recorded. The more shows icon 374 presents a link to further programming available on ESPN—such as a link to the channel guide of the EPG with ESPN as the selected channel.

It should be noted, that as indicated in now playing pane 352-6, if a program icon is not available, text indicating the current programming can be substituted. In a similar fashion, of a next showing icon is not available indicating the next program showing on a particular video channel, text may be substituted in lieu thereof. A scrolling tool 358 is presented that allows the user to scroll through the now playing panes 352-n for each of the video channels. In the example shown, the scrolling tool 358 is a scroll bar that allows the user through rows of now playing panes to move forward and backward in the linear ordering of video channels. While a vertical scrolling tool is shown, a horizontal scrolling tool can be used in addition or in the alternative.

Figure 10:
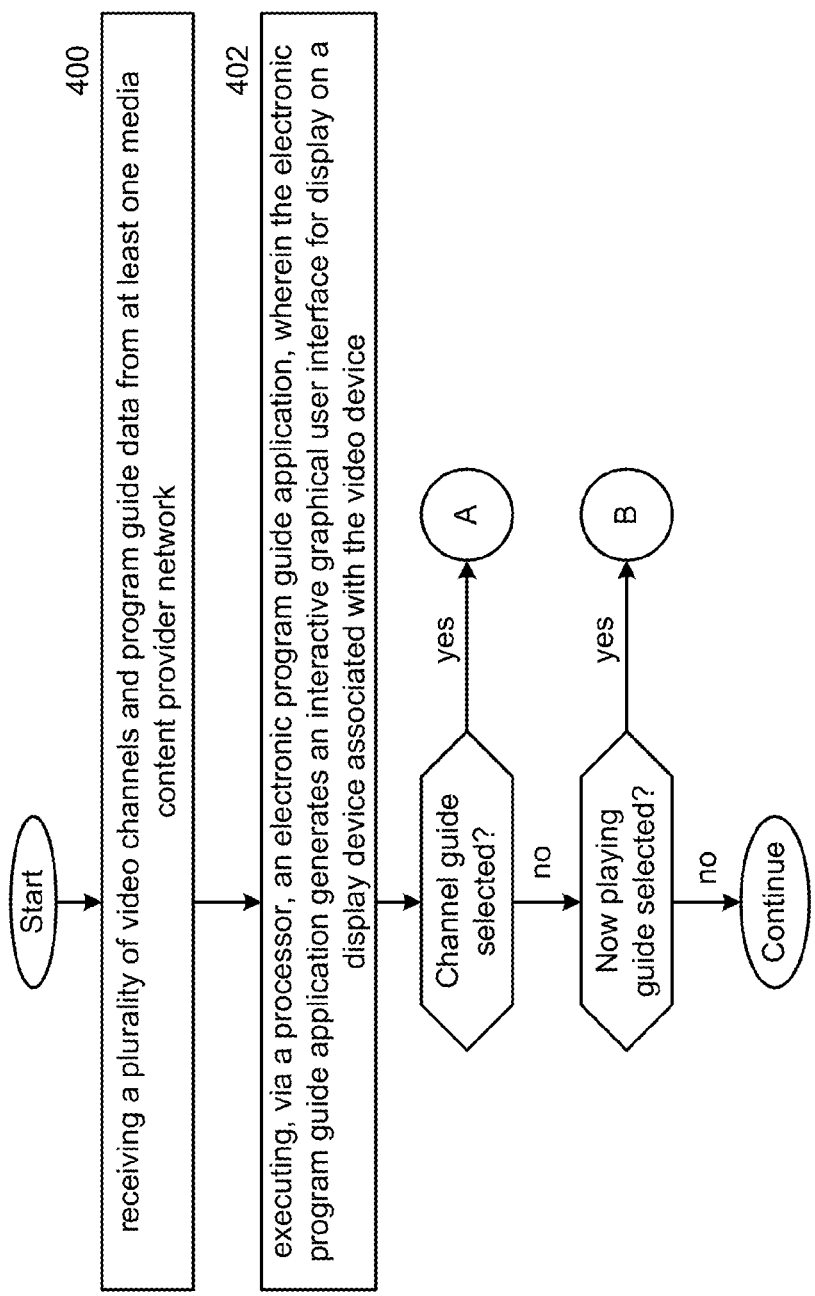
FIG. 10 presents a flowchart representation of a method in accordance with an embodiment of the present disclosure.

FIG. 10 presents a flowchart representation of a method in accordance with an embodiment of the present disclosure. In particular, a method is presented for use with one or more functions and features described in conjunction with FIGS. 1-9. Step 400 includes receiving a plurality of video channels and program guide data from at least one media content provider network. Step 402 includes executing, via a processor, an electronic program guide application, wherein the electronic program guide application generates an interactive graphical user interface for display on a display device associated with the video device. The method determines whether or not a channel guide is selected, and if so, proceeds to "A" as presented in FIG. 11. The method determines whether or not a now playing guide is selected, and if so, proceeds to "B" presented in FIG. 12.

FIG. 11 presents a flowchart representation of a method in accordance with an embodiment of the present disclosure. In particular, a method is presented for use with one or more functions and features described in conjunction with FIGS. 1-10. Step 410 includes presenting a channel navigation region that operates in response to user interaction to display a plurality of channel icons corresponding to at least a subset of the plurality of video channels and in accordance with a linear ordering of the plurality of video channels and a channel lens pane that presents a selected channel icon, channel information corresponding to a selected one of the plurality of video channels, and at least one interactive channel rank control icon configured to respond to user interaction to modify a position of the selected channel icon in the linear ordering of the plurality of channel icons. Step 412 includes presenting a channel schedule region that presents a nonlinear temporal ordering of program panes, each program pane corresponding to one of a plurality of programs presented on the selected one of the plurality of video channels, wherein each program pane includes a program icon, program schedule information relating to a time the corresponding one of the plurality of programs is presented on the selected one of the plurality of video channels.

In various embodiments, the at least one interactive channel rank control icon includes a bump control that advances the position of the selected channel icon in the linear ordering of the plurality of video channels.

FIG. 12 presents a flowchart representation of a method in accordance with an embodiment of the present disclosure. In particular, a method is presented for use with one or more functions and features described in conjunction with FIGS. 1-11. Step 420 includes presenting a plurality of now playing panes, each now playing pane corresponding to one of a subset of the plurality of video channels, wherein each now playing pane includes: a now playing icon indicating a current program of the plurality of programs presented on the one of the subset of the plurality of video channels; a next showing icon indicating a next program of the plurality of programs to be presented on the one of the subset of the plurality of video channels; and the channel icon indicating the one of the subset of the plurality of video channels.

In various embodiments, the plurality of now playing panes are shown in a two-dimensional array that is based on the linear ordering of the plurality of video channels. Further, the now playing icon can be smaller than the next showing icon.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A video device comprising:
  a network interface configured to receive a plurality of video channels and program guide data from at least one media content provider network;
  a memory configured to store an electronic program guide application and the program guide data;
  a processor, coupled to the memory and the network interface, configured to execute the electronic program guide application, wherein the electronic program guide application generates an interactive graphical user interface for display on a display device associated with the video device, wherein when a channel guide is selected, the interactive graphical user interface includes:
    a channel navigation region that operates in response to user interaction to display a plurality of channel icons corresponding to at least a subset of the plurality of video channels and in accordance with a linear ordering of the plurality of channel icons and a channel lens pane that presents a selected channel icon, channel information corresponding to a selected one of the plurality of video channels, and at least one interactive channel rank control icon configured to respond to user interaction to modify a position of the selected channel icon in the linear ordering of the plurality of channel icons; and
    a channel schedule region that presents a nonlinear temporal ordering of program panes, each program pane corresponding to one of a plurality of programs presented on the selected one of the plurality of video channels, wherein each program pane includes a program icon, program schedule information relating to a time the corresponding one of the plurality of programs is presented on the selected one of the plurality of video channels.

2. The video device of claim 1 wherein the at least one interactive channel rank control icon includes a bump control that advances the position of the one of the plurality of video channels in the linear ordering of the plurality of video channels.

3. The video device of claim 1 wherein the at least one interactive channel rank control icon includes a reset control that resets the position of the selected one of the plurality of video channels to a default position in the linear ordering of the plurality of video channels.

4. The video device of claim 1 wherein the memory further stores a recording schedule and the interactive graphical user interface further includes:
    a recording scheduled notification in the program pane corresponding to the one of the plurality of programs if the corresponding one of the plurality of programs is scheduled for recording; and
    a currently recording notification in the program pane corresponding to the one of the plurality of programs if the corresponding one of the plurality of programs is contemporaneously recording.

5. The video device of claim 1 wherein the channel navigation region includes a scrolling tool that operates in response to the user interaction to scroll through the linear ordering of the plurality of channel icons and to select the selected one of the plurality of video channels.

6. The video device of claim 1 wherein the nonlinear temporal ordering of program panes includes a two-dimensional ordering including a plurality of rows and a plurality of columns.

7. The video device of claim 1 wherein when a now playing guide is selected, the interactive graphical user interface includes a plurality of now playing panes, each now playing pane corresponding to one of a subset of the plurality of video channels, wherein each now playing pane includes:
    a now playing icon indicating a current program of the plurality of programs presented on the one of the subset of the plurality of video channels;
    a next showing icon indicating a next program of the plurality of programs to be presented on the one of the subset of the plurality of video channels; and
    the channel icon indicating the one of the subset of the plurality of video channels.

8. The video device of claim 7 wherein each now playing pane further includes a time indicating when the next program of the plurality of programs is to be presented on the one of the subset of the plurality of video channels.

9. The video device of claim 7 wherein the plurality of now playing panes are shown in a two-dimensional array that is based on the linear ordering of the plurality of video channels.

10. The video device of claim 7 wherein the now playing icon is smaller than the next showing icon.

11. The video device of claim 7 wherein each of the now playing panes includes the at least one interactive channel rank control icon.

12. The video device of claim 7 wherein the memory further stores a recording schedule and the interactive graphical user interface further includes:
    a recording scheduled notification in the now playing pane if the next program of the plurality of programs is scheduled for recording; and
    a currently recording notification in the now playing pane if the current program of the plurality of programs is scheduled for recording.

13. A method comprising:
receiving a plurality of video channels and program guide data from at least one media content provider network;
executing, via a processor, an electronic program guide application, wherein the electronic program guide application generates an interactive graphical user interface for display on a display device associated with a video device, wherein when a channel guide is selected, the interactive graphical user interface includes:
    a channel navigation region that operates in response to user interaction to display a plurality of channel icons corresponding to at least a subset of the plurality of video channels and in accordance with a linear ordering of the plurality of channel icons and a channel lens pane that presents a selected channel icon, channel information corresponding to a selected one of the plurality of video channels, and at least one interactive channel rank control icon configured to respond to user interaction to modify a position of the selected channel icon in the linear ordering of the plurality of channel icons; and
    a channel schedule region that presents a nonlinear temporal ordering of program panes, each program pane corresponding to one of a plurality of programs presented on the selected one of the plurality of video channels, wherein each program pane includes a program icon, program schedule information relating to a time the corresponding one of the plurality of programs is presented on the selected one of the plurality of video channels.

14. The method of claim 13 wherein the at least one interactive channel rank control icon includes a bump control that advances the position of the selected one of the plurality of video channels in the linear ordering of the plurality of video channels.

15. The method of claim 13 wherein when a now playing guide is selected, the interactive graphical user interface includes a plurality of now playing panes, each now playing pane corresponding to one of a subset of the plurality of video channels, wherein each now playing pane includes:
- a now playing icon indicating a current program of the plurality of programs presented on the one of the subset of the plurality of video channels;
- a next showing icon indicating a next program of the plurality of programs to be presented on the one of the subset of the plurality of video channels; and
- the channel icon indicating the one of the subset of the plurality of video channels.

16. The method of claim 15 wherein the plurality of now playing panes are shown in a two-dimensional array that is based on the linear ordering of the plurality of video channels.

17. The method of claim 15 wherein the now playing icon is smaller than the next showing icon.

* * * * *